US011451566B2

(12) United States Patent
Wu

(10) Patent No.: US 11,451,566 B2
(45) Date of Patent: Sep. 20, 2022

(54) NETWORK TRAFFIC ANOMALY DETECTION METHOD AND APPARATUS

(71) Applicants: NSFOCUS INFORMATION TECHNOLOGY CO., LTD., Beijing (CN); NSFOCUS TECHNOLOGIES, INC., Beijing (CN)

(72) Inventor: Zijian Wu, Beijing (CN)

(73) Assignees: NSFOCUS INFORMATION TECHNOLOGY CO., LTD., Beijing (CN); NSFOCUS TECHNOLOGIES, INC., Beijing (CN)

( * ) Notice: Subject to any disclaimer, the term of this patent is extended or adjusted under 35 U.S.C. 154(b) by 622 days.

(21) Appl. No.: 16/474,998

(22) PCT Filed: Nov. 27, 2017

(86) PCT No.: PCT/CN2017/113217
§ 371 (c)(1),
(2) Date: Jun. 28, 2019

(87) PCT Pub. No.: WO2018/121157
PCT Pub. Date: Jul. 5, 2018

(65) Prior Publication Data
US 2020/0007566 A1    Jan. 2, 2020

(30) Foreign Application Priority Data
Dec. 29, 2016 (CN) .......................... 201611246751.7

(51) Int. Cl.
*H04L 29/06* (2006.01)
*G06K 9/62* (2022.01)
*H04L 9/40* (2022.01)

(52) U.S. Cl.
CPC ........ *H04L 63/1425* (2013.01); *G06K 9/6269* (2013.01); *H04L 63/1416* (2013.01); *H04L 63/1433* (2013.01); *H04L 63/1475* (2013.01)

(58) Field of Classification Search
CPC ............ H04L 63/1425; H04L 63/1416; H04L 63/1433; H04L 63/1475; H04L 63/1466;
(Continued)

(56) References Cited

U.S. PATENT DOCUMENTS 9,985,982 B1 * 5/2018 Bartos ................. H04L 63/1425
2003/0097439 A1 * 5/2003 Strayer ................... H04L 51/34
709/224
(Continued)

FOREIGN PATENT DOCUMENTS

CN    101848160 A    9/2010
CN    103368979 A    10/2013
(Continued)

OTHER PUBLICATIONS

English language translation of CN10184160A [Qian] (10 pages) (Year: 2010).*
(Continued)

*Primary Examiner* — Fatoumata Traore
*Assistant Examiner* — Thomas A Gyorfi
(74) *Attorney, Agent, or Firm* — Renner, Otto, Boisselle & Sklar, LLP

(57) ABSTRACT

A network traffic anomaly detection method and apparatus is provided. The method includes: acquiring network flows generated by a network monitoring node within a set period of time; for any one of attributes in the network flows, aggregating the network flows at a set time interval according to the attribute to generate N time sequences with respect to the attribute; determining N samples to be detected corresponding to the network flows according to the N time sequence, calculating respective angular dissimilarity degrees between a first time sequence and N−1 second time sequences corresponding to a first attribute in the other N−1
(Continued)

samples to be detected, and determining a first detection result with respect to the first time sequence; and determining whether each of the samples to be detected is an abnormal data stream according to a detection result.

15 Claims, 3 Drawing Sheets

(58) Field of Classification Search
CPC ............ H04L 63/1408; H04L 63/1441; G06K 9/6269
See application file for complete search history.

(56) References Cited

U.S. PATENT DOCUMENTS

| | | | |
|---|---|---|---|
| 2003/0236995 A1* | 12/2003 | Fretwell, Jr. ............ | H04L 67/14 726/25 |
| 2005/0193429 A1 | 9/2005 | Demopoulos | |
| 2006/0212942 A1* | 9/2006 | Barford ............... | H04L 63/1425 713/188 |
| 2012/0284791 A1* | 11/2012 | Miller ................. | H04L 63/0227 726/22 |
| 2016/0359872 A1* | 12/2016 | Yadav ................. | H04L 63/1408 |

FOREIGN PATENT DOCUMENTS

| | | |
|---|---|---|
| CN | 103488878 A | 1/2014 |
| CN | 104394021 A | 3/2015 |
| CN | 106506556 A | 3/2017 |

OTHER PUBLICATIONS

English language translation of CN103368979A [Zhang] (12 pages) (Year: 2013).*

* cited by examiner

NETWORK TRAFFIC ANOMALY DETECTION METHOD AND APPARATUS

This application is a National Stage of International Publication No. WO2018/121157A1, filed Nov. 27, 2017, which claims the priority of Chinese Patent Application No. 201611246751.7, filed with the Chinese Patent Office on Dec. 29, 2016, both of which are hereby incorporated by reference in their entireties.

FIELD

The present invention relates to the field of network security, and particularly to a method and apparatus for detecting traffic abnormality in a network.

BACKGROUND

A defending system including security devices such as an Intrusion Detection System (IDS) is generally deployed at an entrance to an intranet to defend an environment in the intranet to thereby greatly alleviate a security threat from outside. However the security in the intranet is frequently disregarded. Since there is generally a weak defense in the intranet, there are frequently happening security accidents, e.g., an authority-surpassing access, a malicious access, data disclosure, etc., brought by a person in the intranet. Furthermore if a hacker breaks through a defending device between the intranet and the extranet, and invades the intranet successfully, then the hacker will enter an all-open network environment, and all the resources in the intranet may be attacked and misappropriated by the hacker.

In order to defend the intranet, the existing technical solutions are generally rule-based defending solutions. In the existing methods for detecting abnormality based upon a time sequence, the dissimilarity between time sequences is generally measured using an Euclidean distance, but these methods for detecting abnormality are so sensitive to translation and expanding transformations that these transformations may be eliminated. For example, clocks of the devices are not completely synchronized in many scenarios, so recorded data may be somewhat translated on the time axis. For example, the number of bytes may be recorded at different scales, so the time sequences may be expanded and transformed. If these transformations are eliminated, then the recorded data may show a similar evolvement trend, thus resulting in an error in a result of detecting a data flow.

In summary, it is difficult for the existing solutions to detect abnormal traffic in the network accurately, and thus impossible for them to guarantee the accuracy of a detection result.

SUMMARY

Embodiments of the invention provide a method and apparatus for detecting traffic abnormality in a network so as to provide a method for detecting traffic abnormality in a network more accurately to thereby improve the accuracy of a detection result.

In a first aspect, a method for detecting traffic abnormality in a network according to an embodiment of the invention includes:

obtaining net flows generated by network monitoring nodes in a set period of time;

aggregating, for any one of attributes of the net flows, the net flows at a set interval of time according to the any one of the attributes to generate N number of time sequences for the any one of the attributes;

determining N number of samples to be detected, corresponding to the net flows according to the N number of time sequences corresponding respectively to each of the attributes, wherein each sample to be detected includes time sequences corresponding to respective attributes in a same aggregation period of time;

calculating, for a first time sequence corresponding to a first attribute of a first sample to be detected, dissimilarities in angle between the first time sequence, and (N−1) number of second time sequences corresponding to the first attribute of the other (N−1) number of samples to be detected, respectively, wherein the first sample to be detected is any one of the N number of samples to be detected, the first attribute is any one of the attributes of the net flows, and each of the dissimilarities in angle is a sine value of an angle between a vector of the first time sequence and a vector of a corresponding second time sequence; and determining a first detection result for the first time sequence according to (N−1) number of dissimilarities in angle corresponding to the first time sequence; and determining whether each sample to be detected is an abnormal data flow, according to a detection result for each time sequence in each sample to be detected.

In a possible implementation, the method for determining the first detection result includes:

determining whether a sum of the (N−1) number of dissimilarities in angle corresponding to the first time sequence is greater than a set threshold, and if so, then generating a first detection result that the first time sequence is an abnormal time sequence; otherwise, generating a first detection result that the first time sequence is a normal time sequence; and determining whether each sample to be detected is an abnormal data flow, according to the detection result for each time sequence in each sample to be detected includes:

determining whether a number of abnormal time sequences in each sample to be detected is greater than a number of normal time sequences in the sample to be detected, and if so, then determining that the sample to be detected is an abnormal data flow; otherwise, determining that the sample to be detected is a normal data flow.

In a possible implementation, calculating (N−1) number of dissimilarities in angle between the first time sequence, and the (N−1) number of second time sequences corresponding to the first attribute of the other (N−1) number of samples to be detected, respectively in an equation of:

$$\sin\theta_{xy} = \sqrt{1-\cos^2\theta_{xy}} = \sqrt{1-\left(\frac{x\cdot y}{\|x\|\cdot\|y\|}\right)^2},$$

wherein x is the vector of the first time sequence, y is the vector of the second time sequence, $\theta_{xy}$ is the angle between the vector of the first time sequence and the vector of the second time sequence, and $\sin\theta_{xy}$ is the dissimilarity in angle between the vector of the first time sequence and the vector of the second time sequence.

Furthermore the method further includes:

classifying the first time sequence corresponding to the first attribute in the first sample to be detected by using a preset one-class Support Vector Machine (SVM) classifier corresponding to the first attribute;

determining a second detection result for the first time sequence according to a classification result, wherein if the classification result shows a same class, then the second detection result is that the first time sequence is a normal time sequence; otherwise, the second detection result is that the first time sequence is an abnormal time sequence; and weighting and summing up the first detection result and the second detection result to obtain a target detection result for the first time sequence.

Furthermore, it is also determined whether a number of abnormal time sequences is greater than a number of normal time sequences in target detection results corresponding to respective time sequences in each sample to be detected, and if so, determining that the sample to be detected is an abnormal data flow; otherwise, determining that the sample to be detected is a normal data flow.

In a possible implementation, the preset one-class SVM classifier corresponding to the first attribute is generated by:

obtaining historical net flows before the set period of time; and aggregating, for the first attribute of the historical net flows, the historical net flows at a set interval of time according to the first attribute to generate N number of time sequences for the first attribute, wherein the first attribute is any one of the attributes of the net flows; and generating the one-class SVM classifier for the first attribute by using the N number of time sequences corresponding to the first attribute as training data.

In a second aspect, based upon the same inventive idea, an embodiment of the invention further provides an apparatus for detecting traffic abnormality in a network, the apparatus including:

an obtaining unit configured to obtain net flows generated by network monitoring nodes in a set period of time;

a processing unit configured to aggregate, for any one of attributes of the net flows, the net flows at a set interval of time according to the any one of the attributes to generate N number of time sequences for the any one of the attributes;

a determining unit configured to determine N number of samples to be detected, corresponding to the net flows according to the N number of time sequences corresponding respectively to each of the attributes, wherein each sample to be detected includes time sequences corresponding to respective attributes in a same aggregation period of time;

a calculating unit configured to, calculate, for a first time sequence corresponding to a first attribute of a first sample to be detected, dissimilarities in angle between the first time sequence, and (N−1) number of second time sequences corresponding to the first attribute of the other (N−1) number of samples to be detected, respectively, wherein the first sample to be detected is any one of the N number of samples to be detected, the first attribute is any one of the attributes of the net flows, and each of the dissimilarities in angle is a sine value of an angle between a vector of the first time sequence and a vector of a corresponding second time sequence; and determine a first detection result for the first time sequence according to (N−1) number of dissimilarities in angle corresponding to the first time sequence; and a detecting unit configured to determine whether each sample to be detected is an abnormal data flow, according to a detection result for each time sequence in each sample to be detected.

Furthermore the detecting unit is configured to:

determine whether a sum of the (N−1) number of dissimilarities in angle corresponding to the first time sequence is greater than a set threshold, and if so, generate a first detection result that the first time sequence is an abnormal time sequence; otherwise, generate a first detection result that the first time sequence is a normal time sequence; and determine whether a number of abnormal time sequences in each sample to be detected is greater than a number of normal time sequences in the sample to be detected, and if so, determine that the sample to be detected is an abnormal data flow; otherwise, determine that the sample to be detected is a normal data flow.

Furthermore the calculating unit is configured to:

calculate (N−1) number of dissimilarities in angle between the first time sequence, and the (N−1) number of second time sequences corresponding to the first attribute of the other (N−1) number of samples to be detected, respectively in an equation of:

$$\sin\theta_{xy} = \sqrt{1 - \cos^2\theta_{xy}} = \sqrt{1 - \left(\frac{x \cdot y}{\|x\| \cdot \|y\|}\right)^2},$$

wherein x is the vector of the first time sequence, y is the vector of the second time sequence, $\theta_{xy}$ is the angle between the vector of the first time sequence and the vector of the second time sequence, and $\sin\theta_{xy}$ is the dissimilarity in angle between the vector of the first time sequence and the vector of the second time sequence.

Furthermore the apparatus further includes: a classifying unit configured to classify the first time sequence corresponding to the first attribute in the first sample to be detected by using a preset one-class Support Vector Machine (SVM) classifier corresponding to the first attribute; and the detecting unit is further configured to: determine a second detection result for the first time sequence according to a classification result, wherein if the classification result shows a same class, then the second detection result is that the first time sequence is a normal time sequence; otherwise, the second detection result is that the first time sequence is an abnormal time sequence; weight and sum up the first detection result and the second detection result to obtain a target detection result for the first time sequence; and determine whether a number of abnormal time sequences is greater than a number of normal time sequences in target detection results corresponding to respective time sequences in each sample to be detected, and if so, determine that the sample to be detected is an abnormal data flow; otherwise, determine that the sample to be detected is a normal data flow.

The apparatus further includes a one-class SVM classifier generating unit configured to generate the preset one-class SVM classifier corresponding to the first attribute by:

obtaining historical net flows before the set period of time; and aggregating, for the first attribute of the historical net flows, the historical net flows at a set interval of time according to the first attribute to generate N number of time sequences for the first attribute, wherein the first attribute is any one of the attributes of the net flows; and generating the one-class SVM classifier for the first attribute by using the N number of time sequences corresponding to the first attribute as training data.

In a third aspect, an embodiment of the invention provides an electronic device including a communication interface, a processor, and a memory, wherein:

the processor is configured to invoke instructions stored in the memory, and to execute the instructions to:

obtain net flows generated by network monitoring nodes in a set period of time via the communication interface;

aggregate, for any one of attributes of the net flows, the net flows at a set interval of time according to the any one of the attributes to generate N number of time sequences for the any one of the attributes;

determine N number of samples to be detected, corresponding to the net flows according to the N number of time sequences corresponding respectively to each of the attributes, wherein each sample to be detected includes time sequences corresponding to respective attributes in a same aggregation period of time;

calculate, for a first time sequence corresponding to a first attribute of a first sample to be detected, dissimilarities in angle between the first time sequence, and (N−1) number of second time sequences corresponding to the first attribute of the other (N−1) number of samples to be detected, respectively, wherein the first sample to be detected is any one of the N number of samples to be detected, the first attribute is any one of the attributes of the net flows, and each of the dissimilarities in angle is a sine value of an angle between a vector of the first time sequence and a vector of a corresponding second time sequence; and determine a first detection result for the first time sequence according to (N−1) number of dissimilarities in angle corresponding to the first time sequence; and determine whether each sample to be detected is an abnormal data flow, according to a detection result for each time sequence in each sample to be detected.

In a possible implementation, the processor is configured to:

determine whether a sum of the (N−1) number of dissimilarities in angle corresponding to the first time sequence is greater than a set threshold, and if so, generate a first detection result that the first time sequence is an abnormal time sequence; otherwise, generate a first detection result that the first time sequence is a normal time sequence; and determine whether a number of abnormal time sequences in each sample to be detected is greater than a number of normal time sequences in the sample to be detected, and if so, determine that the sample to be detected is an abnormal data flow; otherwise, determine that the sample to be detected is a normal data flow.

In a possible implementation, the processor is configured to calculate (N−1) number of dissimilarities in angle between the first time sequence, and the (N−1) number of second time sequences corresponding to the first attribute of the other (N−1) number of samples to be detected, respectively in an equation of:

$$\sin\theta_{xy} = \sqrt{1 - \cos^2\theta_{xy}} = \sqrt{1 - \left(\frac{x \cdot y}{\|x\| \cdot \|y\|}\right)^2},$$

wherein x is the vector of the first time sequence, y is the vector of the second time sequence, $\theta_{xy}$ is the angle between the vector of the first time sequence and the vector of the second time sequence, and $\sin\theta_{xy}$ is the dissimilarity in angle between the vector of the first time sequence and the vector of the second time sequence.

Furthermore the processor is configured to:

classify the first time sequence corresponding to the first attribute in the first sample to be detected by using a preset one-class Support Vector Machine (SVM) classifier corresponding to the first attribute;

determine a second detection result for the first time sequence according to a classification result, wherein if the classification result shows a same class, then the second detection result is that the first time sequence is a normal time sequence; otherwise, the second detection result is that the first time sequence is an abnormal time sequence;

weight and sum up the first detection result and the second detection result to obtain a target detection result for the first time sequence; and determine whether a number of abnormal time sequences is greater than a number of normal time sequences in target detection results corresponding to respective time sequences in each sample to be detected, and if so, determine that the sample to be detected is an abnormal data flow; otherwise, determine that the sample to be detected is a normal data flow.

Furthermore the processor is configured to generate the preset one-class SVM classifier corresponding to the first attribute by:

obtaining historical net flows before the set period of time; and aggregating, for the first attribute of the historical net flows, the historical net flows at a set interval of time according to the first attribute to generate N number of time sequences for the first attribute, wherein the first attribute is any one of the attributes of the net flows; and generating the one-class SVM classifier for the first attribute by using the N number of time sequences corresponding to the first attribute as training data.

In a fourth aspect, an embodiment of the invention provides a non-transitory computer readable storage medium storing computer instructions for causing a computer to perform the method for detecting traffic abnormality in a network according to any one of the implementations of the first aspect.

In a fifth aspect, an embodiment of the invention provides a computer program product including a computer program stored on a non-transitory computer readable storage medium, the computer program includes computer instructions which, when executed by a computer, cause the computer to perform the method for detecting traffic abnormality in a network according to any one of the implementations of the first aspect.

In the embodiments of the invention, multi-dimension time sequences are detected for abnormality, where the dimensions refer to respective attributes in net flows, e.g., a source IP address, a source port number, a destination IP address, a destination port number, etc., the time sequences of the same attribute in the respective net flows are analyzed for similarity using their dissimilarities in angle to identify one or more abnormal sequences, and since the dissimilarities in angles are sine values of the angles between the vectors of the time sequences, there will be no error in a detection resource even if the clocks of the devices are not completely synchronized, so a more accurate detection result can be obtained in the method and apparatus for detecting traffic abnormality in a network according to the embodiments of the invention, and in this way, an abnormal behavior in the network can be identified in a timely manner and rapidly to thereby detect in effect an attack on the network.

BRIEF DESCRIPTION OF THE DRAWINGS

In order to make the technical solutions according to the embodiments of the invention more apparent, the drawings to which reference is to be made in the description of the embodiments will be introduced below in brief, and apparently the drawings to be described below are only some embodiments of the invention, and those ordinarily skilled in the art can further derive from these drawings other drawings without any inventive effort.

DETAILED DESCRIPTION OF THE
EMBODIMENTS

In order to make the objects, technical solutions, and advantageous effects of the invention more apparent, the invention will be described below in further details with reference to the drawings, and apparently the embodiments to be described are only a part but not all of the embodiments of the invention. Based upon the embodiments here of the invention, all the other embodiments which can occur to those ordinarily skilled in the art without any inventive effort shall fall into the claimed scope of the invention.

Figure 1:
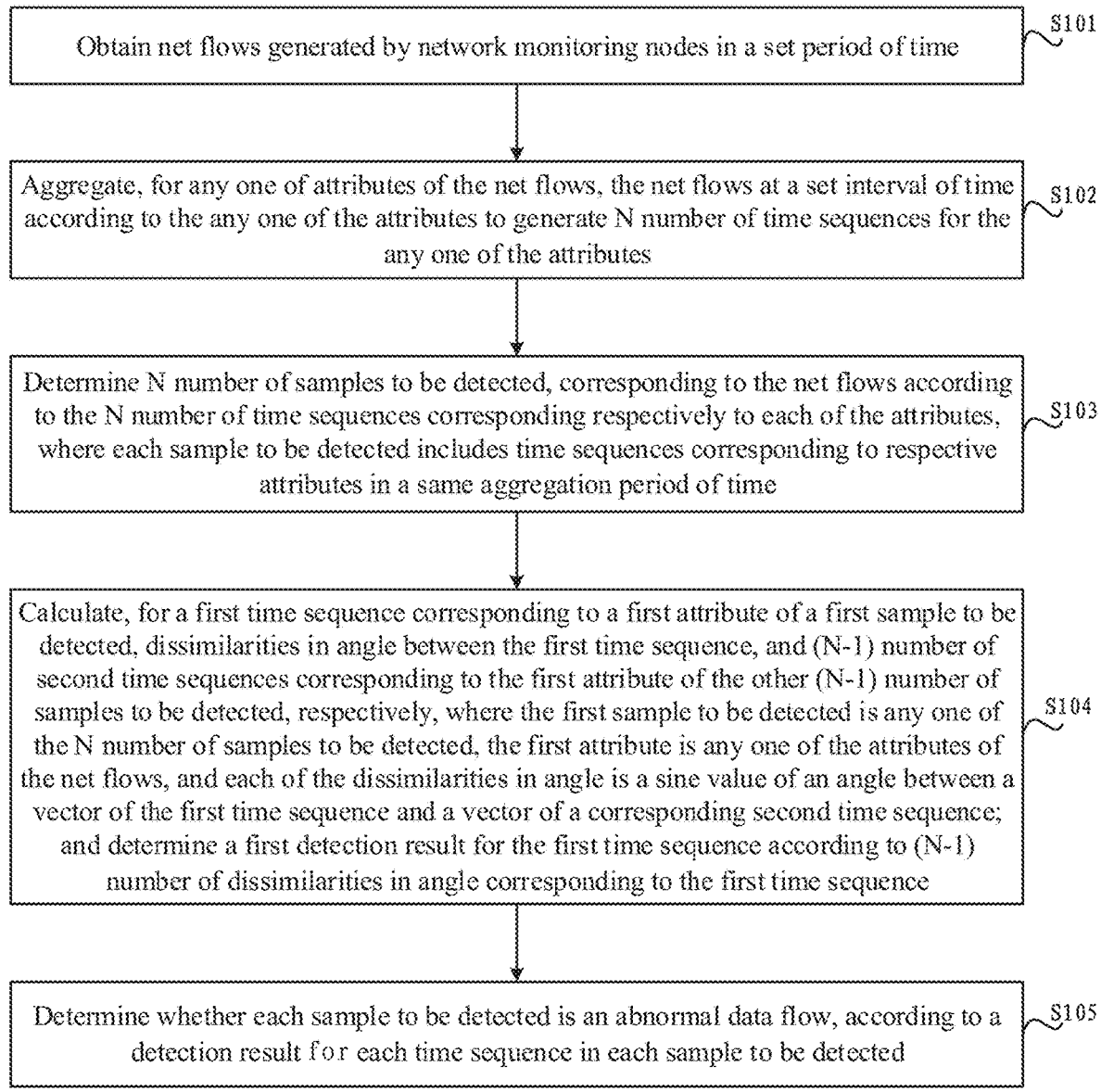
FIG. 1 is a schematic flow chart of a method for detecting traffic abnormality in a network according to an embodiment of the invention.

Referring to FIG. 1 which is a schematic flow chart of a method for detecting traffic abnormality in a network according to an embodiment of the invention, the method particularly includes the following operations.

Operation S101 is to obtain net flows generated by network monitoring nodes in a set period of time.

Operation S102 is to aggregate, for any one of attributes of the net flows, the net flows at a set interval of time according to the any one of the attributes to generate N number of time sequences for the any one of the attributes.

Operation S103 is to determine N number of samples to be detected, corresponding to the net flows according to the N number of time sequences corresponding respectively to each of the attributes, where each sample to be detected includes time sequences corresponding to respective attributes in a same aggregation period of time.

Operation S104 is to calculate, for a first time sequence corresponding to a first attribute of a first sample to be detected, dissimilarities in angle between the first time sequence, and (N−1) number of second time sequences corresponding to the first attribute of the other (N−1) number of samples to be detected, respectively, where the first sample to be detected is any one of the N number of samples to be detected, the first attribute is any one of the attributes of the net flows, and each of the dissimilarities in angle is a sine value of an angle between a vector of the first time sequence and a vector of a corresponding second time sequence; and determine a first detection result for the first time sequence according to (N−1) number of dissimilarities in angle corresponding to the first time sequence.

Operation S105 is to determine whether each sample to be detected is an abnormal data flow, according to a detection result for each time sequence in each sample to be detected.

The operations above are typically performed using a net flow analyzing tool, and the network monitoring nodes typically refer to respective routers or switches; and in the operation S101, net flow (NetFlow) data of the respective routers or switches generally can be acquired using an acquirer, and the acquired data flows can be stored onto a server, so that the net flows can be further processed using various NetFlow data analyzing tools.

The NetFlow generally relates to a suite of protocols for making a statistic of network traffic, and the routers distinguish the net flows from each other using source IP addresses, source port numbers, destination IP addresses, destination port numbers, protocol types, service types, router input interfaces, and other control information. Upon reception of a new data packet anytime, the routers check these control information in the data flow, and determines whether this data packet belongs to any recorded NetFlow, and if so, then they will integrate information about the newly collected data packet into a record of the corresponding NetFlow; otherwise, they will create a new record.

In the operation S102, the attributes of the net flows generally include five attributes of a source IP address, a source port, a destination IP address, a destination port, and a transport layer protocol, and a data packet including these five attributes is a traffic flow; and for example, (192.168.1.1, 10000, 121.14.88.76, 80) indicates that a terminal at an IP address 192.168.1.1 is connected with a terminal at an IP address 121.14.88.76 with a port 80 using the TCP protocol and a port 10000, and a session can be identified uniquely using the five attributes above.

In the operations above, a time sequence is represented as a vector, a vector of the time sequence is an ordered set of a series of data elements, and these data elements include record instances of time and record values represented as:

$X = \langle x_1=(t_1,v_1), x_2=(t_2,v_2), \ldots, x_i=(t_i,v_i), \ldots, x_n=(t_n,v_n) \rangle;$ where an element $x_i=(t_i, v_i)$ indicates that a record value $v_i$ is obtained at an instance $t_i$ of time, and the record instance $t_i$ of time here is strictly monotonically increased, that is, respective data are accumulated constantly over time; and |X| is referred to as the modulus of a vector X of time sequence, and represents the length of the time sequence. For a time sequence in a broad sense, the record value $v_i$ can be a discrete symbol, a structured data, and/or multimedia data, etc., and for a time sequence in a narrow sense, the record value $v_i$ can be a real number.

By way of an example, NetFlow data acquiring software acquires a traffic flow for an hour, and then stores it onto a server, and then a NetFlow data analyzing tool retrieves consecutively stored net flows of ten hours from the server, aggregates the retrieved net flows into net flows in ten aggregation periods of time, each of which has a 1-hour length of time, and then generates three time sequences of three attributes (a source IP address, a source port, and a transport layer protocol number) of net flows in each of the ten aggregation periods, so that for the source IP address attribute, there are ten time sequences of net flows of the ten aggregation periods, and a sample to be detected includes a time sequence corresponding to the source IP address, a time sequence corresponding to the source port, and a time sequence corresponding to the transport layer protocol number in the same period of time, thus resulting in ten samples to be detected, and next the time sequences in each sample to be detected can be detected for an abnormal sample.

Furthermore the time sequences in each sample to be detected are detected as follows: for a first time sequence in a first sample to be detected, (N−1) number of dissimilarities in angle between the first time sequence, and the (N−1) number of second time sequences corresponding to the first attribute of the other (N−1) number of samples to be detected, respectively are calculated in Equation (1) of:

$$\sin\theta_{xy} = \sqrt{1 - \cos^2\theta_{xy}} = \sqrt{1 - \left(\frac{x \cdot y}{\|x\| \cdot \|y\|}\right)^2};$$

where x is the vector of the first time sequence, y is the vector of the second time sequence, $\theta_{xy}$ is the angle between the vector of the first time sequence and the vector of the second time sequence, and $\sin \theta_{xy}$ is the dissimilarity in angle between the vector of the first time sequence and the vector of the second time sequence.

Further to the example above, for the source IP address attribute, there are ten time sequences of net flows of the ten aggregation periods, and if the vector of the first time sequence, for the source IP address attribute, in the first sample to be detected is X1, the vector of the time sequence, for the source IP address attribute, in the second sample to be detected is X2, . . . , and a vector of time sequence, for the source IP address attribute, in the tenth sample to be detected is X10, then the dissimilarities in angle between X1, and X2, X3, . . . , X10 respectively can be calculated respectively in Equation (1), and for example, the dissimilarity in angle between X1 and X2 is:

$$\sin \theta_{X1X2} = \sqrt{1 - \cos^2 \theta_{X1X2}} = \sqrt{1 - \left(\frac{X1 \cdot X2}{\|X1\| \cdot \|X2\|}\right)^2}.$$

Similarly the dissimilarities in angle $\sin \theta_{X1X2}$, $\sin \theta_{X1X3}$, $\sin \theta_{X1X4}$, $\sin \theta_{X1X5}$, $\sin \theta_{X1X6}$, $\sin \theta_{X1X7}$, $\sin \theta_{X1X8}$, $\sin \theta_{X1X9}$ and $\sin \theta_{X1X10}$ between the vector of the first time sequence and the other vectors of nine time sequences respectively can be calculated, and alike the dissimilarities in angle can also be calculated in the same way respectively for vectors of time sequences of the other attributes of the first sample to be detected, so the dissimilarities in angle of each vector of time sequence in the other nine samples to be detected can be calculated in the same way as the first sample to be detected, so a repeated description thereof will be omitted here.

Furthermore after the dissimilarities in angle of each time sequence in the respective samples to be detected are calculated, determining whether a sum of the (N−1) number of dissimilarities in angle corresponding to the first time sequence is greater than a set threshold, and if so, then a first detection result that the first time sequence is an abnormal time sequence will be generated; otherwise, a first detection result that the first time sequence is a normal time sequence will be generated.

Stated otherwise, these nine dissimilarities in angle $\sin \theta_{X1X2}$, $\sin \theta_{X1X3}$, $\sin \theta_{X1X4}$, $\sin \theta_{X1X5}$, $\sin \theta_{X1X6}$, $\sin \theta_{X1X7}$, $\sin \theta_{X1X8}$, $\sin \theta_{X1X9}$ and $\sin \theta_{X1X10}$ calculated in the first time sequence are summed up, the sum is compared with the set threshold, and if the sum is greater than the set threshold, then it will indicate that the first time sequence is an abnormal time sequence, otherwise, it will indicate that the first time sequence is a normal time sequence.

Furthermore determining whether a number of abnormal time sequences in each sample to be detected is greater than a number of normal time sequences in the sample to be detected, and if so, then the sample to be detected will be an abnormal data flow; otherwise, the sample to be detected will be a normal data flow.

For example, such a detection result is obtained as described above that the vector of time sequence of the source IP address attribute in the first sample to be detected is an abnormal time sequence, the vector of the time sequence of the source port attribute in the first sample to be detected is an abnormal time sequence, and the vector of the time sequence of the transport layer protocol number attribute in the first sample to be detected is a normal time sequence, so the number of abnormal time sequences is greater than the number of normal time sequences in the first sample to be detected, and thus the time sequences corresponding to the first sample to be detected are abnormal time sequences.

Furthermore time sequences in each sample to be detected can be further detected using one-class Support Vector Machine (SVM) classifiers in addition to the dissimilarities in angle as follows.

The first time sequence corresponding to the first attribute in the first sample to be detected is classified by using a preset one-class SVM classifier corresponding to the first attribute.

A second detection result for the first time sequence is determined according to a classification result, where if the classification result shows a same class, then the second detection result is that the first time sequence is a normal time sequence; otherwise, the second detection result is that the first time sequence is an abnormal time sequence.

The first detection result and the second detection result are weighted and summed up to obtain a target detection result for the first time sequence.

Then it is determined whether the number of abnormal time sequences is greater than the number of normal time sequences in target detection results corresponding to respective time sequences in each sample to be detected, and if so, then the sample to be detected will be an abnormal data flow; otherwise, the sample to be detected will be a normal data flow.

Particularly data are classified in such a way that, a classifier is trained under some principle using training data of existing classes, and then data to be classified are classified using the classifier. It shall be noted that all the data are represented in the form of a vector. A general principle of a one-class SVM classifier lies in that a given data sample is mapped into a high-dimension feature space using a kernel function Φ; the high-dimension feature space is searched for an optimum super-plane to separate object data from the origin of coordinates as far as possible, where the origin of coordinates is assumed as a unique abnormal sample. The one-class SVM classifier is trained using one class of data, so that new data can be detected using the well-trained classifier to determine whether the new data are of the same class as the training data. This method for one-class classification based upon a one-class support vector machine is characterized in high training and decision-making speed, highly accurate classification, etc., and applicable to one-class classification of a finite number of high-dimension samples with noise. With the method for one-class classification based upon a one-class support vector machine, the boundary of obtained object data can be estimated, and the data can be classified correctly.

In the embodiment of the invention, M historical samples in the same period of time are pre-selected to train a one-class SVM classifier, and then it is determined using the well-trained classifier whether a sample to be detected is abnormal. Particularly the preset one-class SVM classifier corresponding to the first attribute is generated as follows.

Historical net flows before the set period of time are obtained; and for the first attribute of the historical net flows, the historical net flows are aggregated at a set interval of time according to the first attribute to generate N number of time sequences for the first attribute, where the first attribute is any one of the attributes of the net flows.

The SVM classifier corresponding to the first attribute is generated by using the N number of time sequences corresponding to the first attribute as training data.

Stated otherwise, a SVM classifier corresponding to each attribute in the historical net flows is trained using time sequences of each attribute, so that an obtained new net flow can be detected using the well-trained SVM classifier of each attribute, where a net flow can be detected online or offline, and a net flow is generally detected online by obtaining the net flow in real time from a router or another network monitoring node, and then a detection result is given in real time. Apparently this detection is highly real-time. A net flow is generally detected offline by detecting the net flow stored on a server for a period of time, and apparently this detection is not so real-time, but can be performed for different lengths of time to thereby improve the accuracy of the detection. Particularly in a first scenario, online detection is performed for the purpose of detecting abnormal traffic in the system in real time, and issuing an abnormality alarm in a timely manner. Since online detection is required to be highly real-time, online detection cannot be performed for time sequences with different lengths and granularities. During online detection, firstly a time sequence at an instance of time earlier than the current instance of time by T temporal windows is generated based upon net flow data, and then detected and analyzed for abnormality. In a second scenario, offline detection is further performed in addition to online detection. Since online detection is required to be real-time, there may be a false negative occurring during online detection, so historical data shall be further detected offline. During offline detection, time sequences with different lengths and granularities can be generated, and dissimilarities can be calculated and classifiers can be trained using more historical time sequences in the same period of time.

Figure 2A:
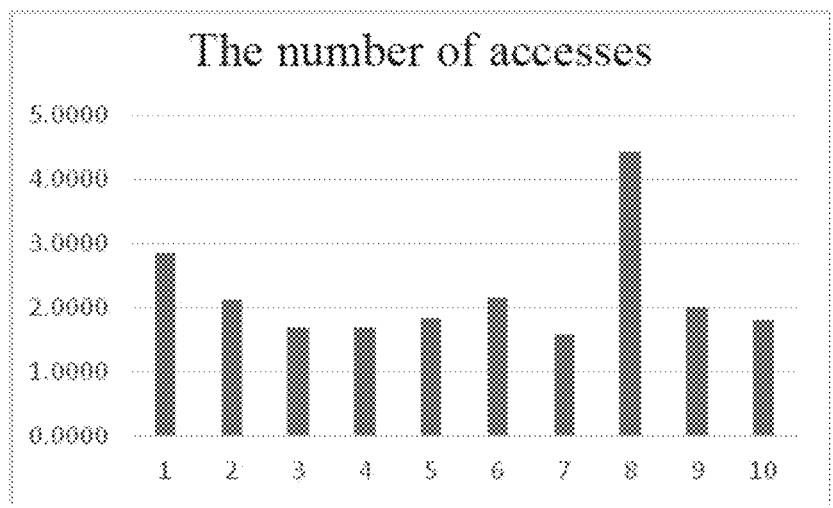
FIG. 2A to FIG. 2C are schematic diagrams of results of detecting traffic abnormality in the network according to the embodiment of the invention.
Figure 2B:
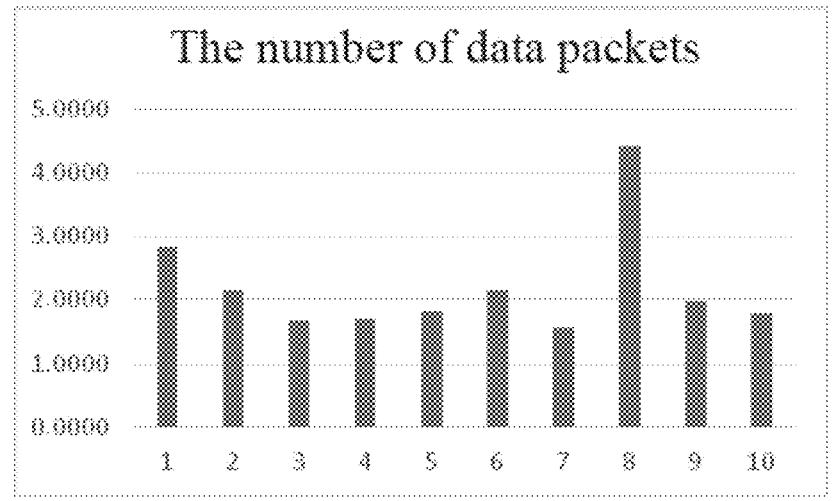
Figure 2C:
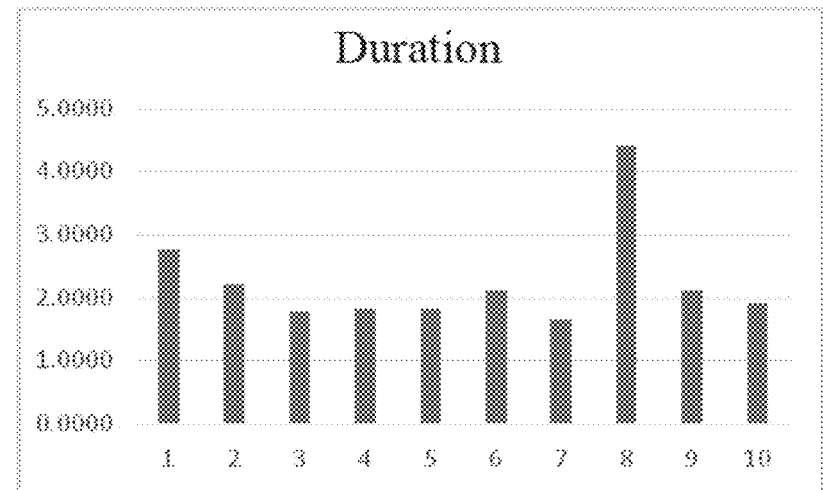

An example of detection for abnormality will be given below, in which Netflow data in an intranet environment are detected. In the embodiment of the invention, for a crucial node in the network, three fields, i.e., the number of accesses for the node as a source IP, the duration of each flow, and the number of data packets to be transmitted, are taken into account, so each detection sample includes three time sequences. For a given instance of time, a time sequence is generated as described above, where T=24 hours, Δt=1 hour, and M=10. Of all the ten time sequences, the eighth time sequence is an abnormal sequence, and the other time sequences are normal sequences. The dissimilarities in angle between the time sequences are calculated as described above. Their calculation results are as illustrated in FIG. 2A, FIG. 2B, and FIG. 2C. As can be apparent from FIG. 2A, FIG. 2B, and FIG. 2C, the sum of the dissimilarities of the three time sequences in the eighth group is far more than those of the other time sequences, so the net flow corresponding to the eighth time sequence is abnormal. In the one-class SVM method, the classifier is trained using the normal sequences and the abnormal sequence is detected, where a detection result thereof also agrees with a real detection result.

Figure 3:
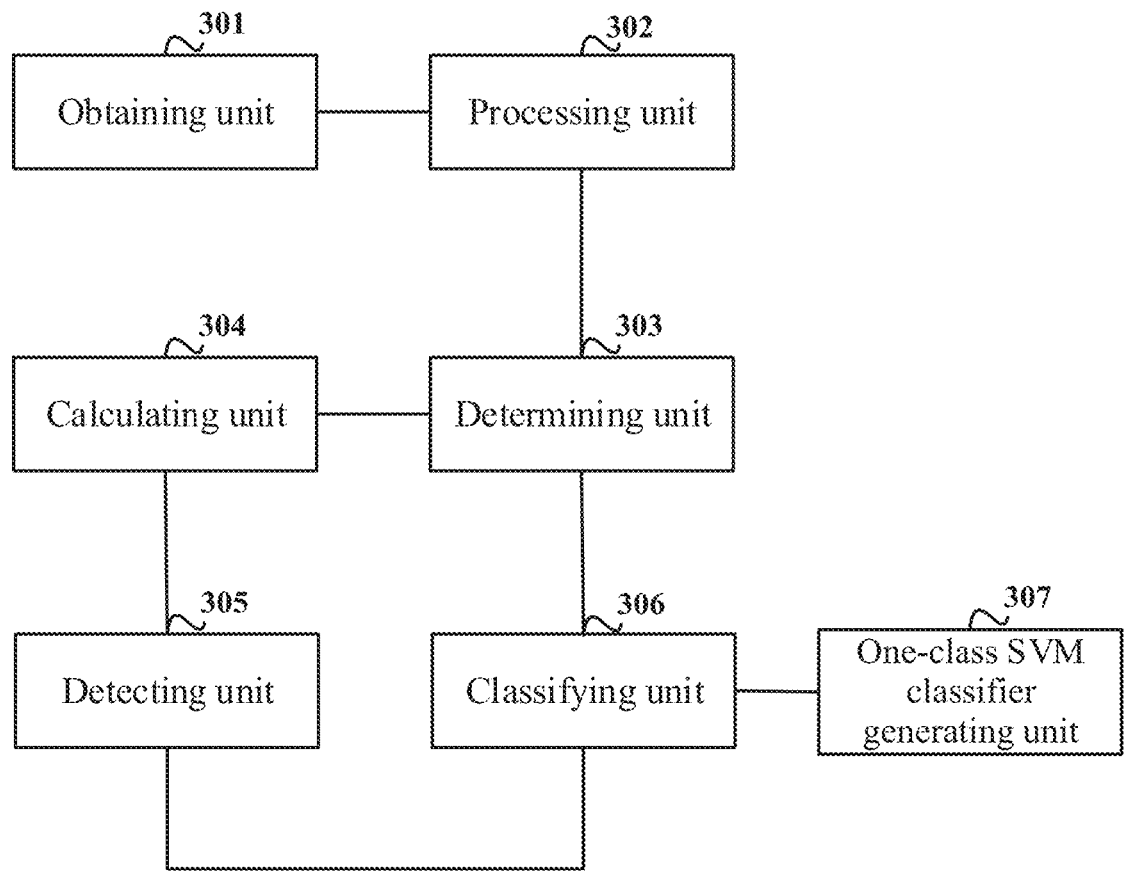
FIG. 3 is a schematic structural diagram of an apparatus for detecting traffic abnormality in a network according to an embodiment of the invention.

Based upon the same inventive idea, an embodiment of the invention further provides an apparatus for detecting traffic abnormality in a network, and the apparatus can perform the method according to the embodiment above of the invention. As illustrated in FIG. 3, the apparatus according to the embodiment of the invention includes: an obtaining unit 301, a processing unit 302, a determining unit 303, a calculating unit 304, and a detecting unit 305.

The obtaining unit 301 is configured to obtain net flows generated by network monitoring nodes in a set period of time.

The processing unit 302 is configured to aggregate, for any one of attributes of the net flows, the net flows at a set interval of time according to the any one of the attributes to generate N number of time sequences for the any one of the attributes.

The determining unit 303 is configured to determine N number of samples to be detected, corresponding to the net flows according to the N number of time sequences corresponding respectively to each of the attributes, where each sample to be detected includes time sequences corresponding to respective attributes in a same aggregation period of time.

The calculating unit 304 is configured to, calculate, for a first time sequence corresponding to a first attribute of a first sample to be detected, dissimilarities in angle between the first time sequence, and (N−1) number of second time sequences corresponding to the first attribute of the other (N−1) number of samples to be detected, respectively, where the first sample to be detected is any one of the N number of samples to be detected, the first attribute is any one of the attributes of the net flows, and each of the dissimilarities in angle is a sine value of an angle between a vector of the first time sequence and a vector of a corresponding second time sequence; and determine a first detection result for the first time sequence according to (N−1) number of dissimilarities in angle corresponding to the first time sequence.

The detecting unit 305 is configured to determine whether each sample to be detected is an abnormal data flow, according to a detection result for each time sequence in each sample to be detected.

Furthermore the detecting unit 305 is configured to:

determine whether a sum of the (N−1) number of dissimilarities in angle corresponding to the first time sequence is greater than a set threshold, and if so, generate a first detection result that the first time sequence is an abnormal time sequence; otherwise, generate a first detection result that the first time sequence is a normal time sequence; and determine whether a number of abnormal time sequences in each sample to be detected is greater than a number of normal time sequences in the sample to be detected, and if so, determine that the sample to be detected is an abnormal data flow; otherwise, determine that the sample to be detected is a normal data flow.

Furthermore the calculating unit 304 is configured to:

calculate (N−1) number of dissimilarities in angle between the first time sequence, and the (N−1) number of second time sequences corresponding to the first attribute of the other (N−1) number of samples to be detected, respectively in Equation (1) of;

$$\sin\theta_{xy} = \sqrt{1 - \cos^2\theta_{xy}} = \sqrt{1 - \left(\frac{x \cdot y}{\|x\| \cdot \|y\|}\right)^2};$$

where x is the vector of the first time sequence, y is the vector of the second time sequence, $\theta_{xy}$ is the angle between the vector of the first time sequence and the vector of the second time sequence, and $\sin\theta_{xy}$ is the dissimilarity in angle.

Furthermore the apparatus further includes: a classifying unit 306 configured to classify the first time sequence corresponding to the first attribute in the first sample to be detected by using a preset one-class Support Vector Machine (SVM) classifier corresponding to the first attribute.

The detecting unit 305 is further configured to, determine a second detection result for the first time sequence according to a classification result, where if the classification result shows a same class, then the second detection result is that the first time sequence is a normal time sequence; otherwise, the second detection result is that the first time sequence is an abnormal time sequence; weight and sum up the first detection result and the second detection result to obtain a target detection result for the first time sequence; and determine whether a number of abnormal time sequences is greater than a number of normal time sequences in target detection results corresponding to respective time sequences in each sample to be detected, and if so, determine that the sample to be detected is an abnormal data flow; otherwise, determine that the sample to be detected is a normal data flow.

Furthermore the apparatus further includes: a one-class SVM classifier generating unit 307 configured to generate the preset one-class SVM classifier corresponding to the first attribute by:

obtaining historical net flows before the set period of time; and aggregating, for the first attribute of the historical net flows, the historical net flows at a set interval of time according to the first attribute to generate N number of time sequences for the first attribute, where the first attribute is any one of the attributes of the net flows; and generating the one-class SVM classifier for the first attribute by using the N number of time sequences corresponding to the first attribute as training data.

In summary, in the embodiments of the invention, multi-dimension time sequences are detected for abnormality, where the dimensions refer to respective attributes in net flows, e.g., a source IP address, a source port number, a destination IP address, a destination port number, etc., the time sequences of the same attribute in the respective net flows are analyzed for similarity using their dissimilarities in angle to identify one or more abnormal sequences, and since the dissimilarities in angles are sine values of the angles between the vectors of the time sequence, there will be no error in a detection resource even if the clocks of the devices are not completely synchronized, so a more accurate detection result can be obtained in the method and apparatus for detecting traffic abnormality in a network according to the embodiments of the invention, and in this way, an abnormal behavior in the network can be identified in a timely manner and rapidly to thereby detect in effect an attack on the network.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide operations for performing the functions specified in the flow(s) of the flow chart and/or the block(s) of the block diagram.

Figure 4:
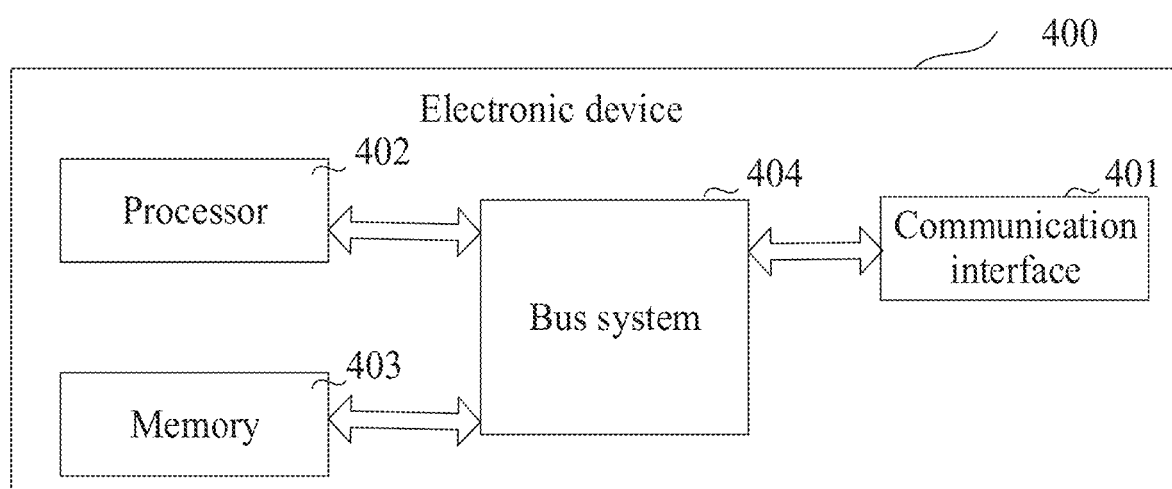
FIG. 4 is a schematic structural diagram of an electronic device according to an embodiment of the invention.

Based upon the same inventive idea, an embodiment of the invention provides another electronic device. FIG. 4 is a schematic structural diagram of an electronic device according to an embodiment of the invention, and the electronic device 400 includes: a communication interface 401, a processor 402, a memory 403, and a bus system 404.

The memory 403 is configured to store a program, and particularly the program can include program codes including computer operation instructions. The memory 403 may be a Random Access Memory (RAM) or a non-transitory memory, e.g., at least one magnetic disk memory. Only one memory is illustrated, but there may be a plurality of memories arranged as needed. The memory 403 can alternatively be a memory in the processor 402.

The memory 403 stores the following elements, such as executable modules or data structures, or their subsets or extended sets, e.g. operation instructions including various operation instructions for performing various operations, an operating system including various system programs for providing various basic services, and performing hardware based tasks.

The method according to the embodiment above of the invention can be applicable to the processor 402, or performed by the processor 402. The processor 402 may be an integrated circuit chip capable of processing a signal. In an implementation, the respective operations in the method above can be performed by integrated logic circuits in hardware, or instructions in software, in the processor 402. The processor 402 can be a general-purpose processor, a Digital Signal Processor (DSP), an Application Specific Integrated Circuit (ASIC), a Field Programmable Gate Array (FPGA), or another programmable logic device, discrete gate, transistor logic device, or discrete hardware component. The respective methods, operations, and logic block diagrams disclosed in the embodiments of the invention can be implemented or performed. The general-purpose processor can be a micro-processor, or can be any conventional processor, etc. The operations in the method according to the embodiment of the invention can be performed directly by a hardware decoding processor, or performed by a combination of hardware and software modules in the decoding processor. The software module can be located in a random memory, a flash memory, a read-only memory, a programmable read-only memory, an electrically erasable and programmable memory, a register, or another storage medium known in the art. The storage medium is located in the memory 403, and the processor 402 reads net flows and program in the memory 403, and performs the following operations with the hardware thereof.

The processor 402 is configured to:

obtain net flows generated by network monitoring nodes in a set period of time via the communication interface 401;

aggregate, for any one of attributes of the net flows, the net flows at a set interval of time according to the any one of the attributes to generate N number of time sequences for the any one of the attributes;

determine N number of samples to be detected, corresponding to the net flows according to the N number of time sequences corresponding respectively to each of the attributes, where each sample to be detected includes time sequences corresponding to each of the attributes in a same aggregation period of time;

calculate, for a first time sequence corresponding to a first attribute of a first sample to be detected, dissimilarities in angle between the first time sequence, and (N−1) number of second time sequences corresponding to the first attribute of the other (N−1) number of samples to be detected, respectively, where the first sample to be detected is any one of the N number of samples to be detected, the first attribute is any one of the attributes of the net flows, and each of the dissimilarities in angle is a sine value of an angle between a vector of the first time sequence and a vector of a corresponding second time sequence; and determine a first detection result for the first time sequence according to (N−1) number of dissimilarities in angle corresponding to the first time sequence; and determine whether each sample to be detected is an abnormal data flow, according to a detection result for each time sequence in each sample to be detected.

Optionally the processor 402 is configured to:

determine whether a sum of the (N−1) number of dissimilarities in angle corresponding to the first time sequence is greater than a set threshold, and if so, generate a first detection result that the first time sequence is an abnormal time sequence; otherwise, generate a first detection result that the first time sequence is a normal time sequence; and determine whether a number of abnormal time sequences in each sample to be detected is greater than a number of normal time sequences in the sample to be detected, and if so, determine that the sample to be detected is an abnormal data flow; otherwise, determine that the sample to be detected is a normal data flow.

Optionally the processor 402 is configured to calculate (N−1) number of dissimilarities in angle between the first time sequence, and the (N−1) number of second time sequences corresponding to the first attribute of the other (N−1) number of samples to be detected, respectively in Equation (1).

Optionally the processor 402 is configured to:

classify the first time sequence corresponding to the first attribute in the first sample to be detected by using a preset one-class Support Vector Machine (SVM) classifier corresponding to the first attribute;

determine a second detection result for the first time sequence according to a classification result, where if the classification result shows a same class, then the second detection result is that the first time sequence is a normal time sequence; otherwise, the second detection result is that the first time sequence is an abnormal time sequence;

weight and sum up the first detection result and the second detection result to obtain a target detection result for the first time sequence; and determine whether a number of abnormal time sequences is greater than a number of normal time sequences in target detection results corresponding to respective time sequences in each sample to be detected, and if so, determine that the sample to be detected is an abnormal data flow: otherwise, determine that the sample to be detected is a normal data flow.

Optionally the processor 402 is configured to generate the preset one-class SVM classifier corresponding to the first attribute by:

obtaining historical net flows before the set period of time; and aggregating, for the first attribute of the historical net flows, the historical net flows at a set interval of time according to the first attribute to generate N number of time sequences for the first attribute, where the first attribute is any one of the attributes of the net flows; and generating the one-class SVM classifier for the first attribute by using the N number of time sequences corresponding to the first attribute as training data.

The electronic device according to the embodiment of the invention can be embodied in a number of forms including but not limited to:

(1) a mobile communication device which is characterized in that it possesses a mobile communication function, and primarily aims to provide voice and data communication. Such a device includes a smart mobile phone (e.g., iPhone), a multimedia mobile phone, a functional mobile phone, a low-end mobile phone, etc.

(2) an ultra-mobile personal computer device which falls into the domain of personal computers, and which possesses computing and processing functions, and generally also a mobile access to the Internet. Such a terminal includes a PDA (Personal Digital Assistant), an MID (Mobile Internet Device), a UMPC (Ultra-mobile Personal Computer), or the like, e.g., iPad.

(3) a portable entertainment device which can display and play multimedia contents. Such a device includes an audio or video player (e.g., iPod), a palm game console, an electronic book, a smart toy, a portable on-vehicle navigation device, etc.

(4) a server which is a device providing a computing service, where the server includes a processor, a hard disk, a memory, a system bus, etc., and the server is similar to a general computer architecture, but since it needs to provide a highly reliable service, it is required to have a high processing capacity, stability, reliability, safety, extensibility, manageability, etc.

(5) other electronic devices capable of exchanging data.

Those skilled in the art can appreciate that all or a part of the operations in the method according to the embodiment above of the invention can be performed by program instructing related hardware, where the program is stored in a storage medium, and includes several instructions for enabling a device (which can be a monolithic processor, a chip, etc.) or a processor to perform all or a part of the operations in the method according to the embodiment above of the invention. The storage medium above includes a U-disk, a mobile hard disk, a Read-Only Memory (ROM), a Random Access Memory (RAM), a magnetic disk, an optical disk, or various mediums in which program codes can be stored.

Furthermore an embodiment of the invention further provides a non-transitory computer readable storage medium on which there are stored computer instructions configured to enable the computer to perform the method for detecting traffic abnormality in a network according to any one of the embodiments above of the invention.

Furthermore an embodiment of the invention further provides a computer program product including computer program stored on a non-transitory computer readable storage medium, where the computer program includes program instructions configured, upon being executed by the computer, to enable the computer to perform the method for detecting traffic abnormality in a network according to any one of the embodiments above of the invention.

Although the preferred embodiments of the invention have been described, those skilled in the art benefiting from the underlying inventive concept can make additional modifications and variations to these embodiments. Therefore the appended claims are intended to be construed as encompassing the preferred embodiments and all the modifications and variations coming into the scope of the invention.

Evidently those skilled in the art can make various modifications and variations to the invention without departing from the spirit and scope of the invention. Thus the invention is also intended to encompass these modifications and variations thereto so long as the modifications and variations come into the scope of the claims appended to the invention and their equivalents.

The invention claimed is:

1. A method for detecting traffic abnormality in a network, the method comprising:
    obtaining net flows generated by a network monitoring node in a set period of time;
    aggregating, for any one of attributes of the net flows, the net flows at a set interval of time according to the any one of the attributes to generate N number of time sequences for the any one of the attributes;
    determining N number of samples to be detected, corresponding to the net flows according to the N number of time sequences corresponding respectively to each of the attributes, wherein each sample to be detected comprises time sequences corresponding to respective attributes in a same aggregation period of time;
    calculating, for a first time sequence corresponding to a first attribute of a first sample to be detected, dissimilarities in angle between the first time sequence, and (N−1) number of second time sequences corresponding to the first attribute of the other (N−1) number of samples to be detected, respectively, wherein the first sample to be detected is any one of the N number of samples to be detected, the first attribute is any one of the attributes of the net flows, and each of the dissimilarities in angle is a sine value of an angle between a vector of the first time sequence and a vector of a corresponding second time sequence; and determining a first detection result for the first time sequence according to (N−1) number of dissimilarities in angle corresponding to the first time sequence; and
    determining whether each sample to be detected is an abnormal data flow, according to a detection result for each time sequence in each sample to be detected.

2. The method according to claim 1, wherein said determining the first detection result for the first time sequence according to the (N−1) number of dissimilarities in angle corresponding to the first time sequence comprises:
    determining whether a sum of the (N−1) number of dissimilarities in angle corresponding to the first time sequence is greater than a set threshold;
    when the sum of the (N−1) number of dissimilarities in angle corresponding to the first time sequence is greater than the set threshold, generating a first detection result that the first time sequence is an abnormal time sequence;
    when the sum of the (N−1) number of dissimilarities in angle corresponding to the first time sequence is not greater than the set threshold, generating a first detection result that the first time sequence is a normal time sequence.

3. The method according to claim 2, wherein said determining whether each sample to be detected is an abnormal data flow, according to the detection result for each time sequence in each sample to be detected comprises:
    determining whether a number of abnormal time sequences in each sample to be detected is greater than a number of normal time sequences in the sample to be detected;
    when the number of abnormal time sequences in each sample to be detected is greater than the number of normal time sequences in the sample to be detected, determining that the sample to be detected is an abnormal data flow;
    when the number of abnormal time sequences in each sample to be detected is not greater than the number of normal time sequences in the sample to be detected, determining that the sample to be detected is a normal data flow.

4. The method according to claim 1, wherein said calculating the dissimilarities in angle between the first time sequence, and the (N−1) number of second time sequences corresponding to the first attribute of the other (N−1) number of samples to be detected, respectively, comprises:
    calculating (N−1) number of dissimilarities in angle between the first time sequence, and the (N−1) number of second time sequences corresponding to the first attribute of the other (N−1) number of samples to be detected, respectively in an equation of:

$$\sin\theta_{xy} = \sqrt{1 - \cos^2\theta_{xy}} = \sqrt{1 - \left(\frac{x \cdot y}{\|x\| \cdot \|y\|}\right)^2},$$

wherein x is the vector of the first time sequence, y is the vector of the second time sequence, $\theta_{xy}$ is the angle between the vector of the first time sequence and the vector of the second time sequence, and $\sin\theta_{xy}$ is the dissimilarity in angle between the vector of the first time sequence and the vector of the second time sequence.

5. The method according to claim 1, wherein the method further comprises:
    classifying the first time sequence corresponding to the first attribute in the first sample to be detected by using a preset one-class Support Vector Machine, SVM, classifier corresponding to the first attribute;
    determining a second detection result for the first time sequence according to a classification result, wherein if the classification result shows a same class, then the second detection result is that the first time sequence is a normal time sequence; otherwise, the second detection result is that the first time sequence is an abnormal time sequence; and
    weighting and summing up the first detection result and the second detection result to obtain a target detection result for the first time sequence.

6. The method according to claim 5, wherein the preset one-class SVM classifier corresponding to the first attribute is generated by:
    obtaining historical net flows before the set period of time; and
    aggregating, for the first attribute of the historical net flows, the historical net flows at a set interval of time according to the first attribute to generate N number of time sequences for the first attribute, wherein the first attribute is any one of the attributes of the net flows; and generating the one-class SVM classifier for the first attribute by using the N number of time sequences corresponding to the first attribute as training data.

7. The method according to claim 5, wherein said determining whether each sample to be detected is an abnormal data flow, according to the detection result for each time sequence in each sample to be detected comprises:

determining whether a number of abnormal time sequences is greater than a number of normal time sequences in target detection results corresponding to respective time sequences in each sample to be detected;

when the number of abnormal time sequences is greater than the number of normal time sequences in target detection results corresponding to respective time sequences in each sample to be detected, determining that the sample to be detected is an abnormal data flow;

when the number of abnormal time sequences is not greater than the number of normal time sequences in target detection results corresponding to respective time sequences in each sample to be detected, determining that the sample to be detected is a normal data flow.

8. A computer program product, comprising a computer program stored on a non-transitory computer readable storage medium, wherein the computer program comprises program instructions configured, upon being executed by a computer, to enable the computer to perform the method according to claim 1.

9. An electronic device, comprising: a communication interface, a processor, and a memory, wherein:

the processor is configured to invoke instructions stored in the memory, and to execute the instructions to:

obtain net flows generated by a network monitoring node in a set period of time via the communication interface;

aggregate, for any one of attributes of the net flows, the net flows at a set interval of time according to the any one of the attributes to generate N number of time sequences for the any one of the attributes;

determine N number of samples to be detected, corresponding to the net flows according to the N number of time sequences corresponding respectively to each of the attributes, wherein each sample to be detected comprises time sequences corresponding to respective attributes in a same aggregation period of time;

calculate, for a first time sequence corresponding to a first attribute of a first sample to be detected, dissimilarities in angle between the first time sequence, and (N−1) number of second time sequences corresponding to the first attribute of the other (N−1) number of samples to be detected, respectively, wherein the first sample to be detected is any one of the N number of samples to be detected, the first attribute is any one of the attributes of the net flows, and each of the dissimilarities in angle is a sine value of an angle between a vector of the first time sequence and a vector of a corresponding second time sequence; and determine a first detection result for the first time sequence according to (N−1) number of dissimilarities in angle corresponding to the first time sequence; and determine whether each sample to be detected is an abnormal data flow, according to a detection result for each time sequence in each sample to be detected.

10. The electronic device according to claim 9, wherein the processor is configured to:

determine whether a sum of the (N−1) number of dissimilarities in angle corresponding to the first time sequence is greater than a set threshold, and if so, generate a first detection result that the first time sequence is an abnormal time sequence; otherwise, generate a first detection result that the first time sequence is a normal time sequence.

11. The electronic device according to claim 10, wherein the processor is configured to:

determine whether a number of abnormal time sequences in each sample to be detected is greater than a number of normal time sequences in the sample to be detected, and if so, determine that the sample to be detected is an abnormal data flow; otherwise, determine that the sample to be detected is a normal data flow.

12. The electronic device according to claim 9, wherein the processor is configured to calculate (N−1) number of dissimilarities in angle between the first time sequence, and the (N−1) number of second time sequences corresponding to the first attribute of the other (N−1) number of samples to be detected, respectively in an equation of:

$$\sin\theta_{xy} = \sqrt{1 - \cos^2\theta_{xy}} = \sqrt{1 - \left(\frac{x \cdot y}{\|x\| \cdot \|y\|}\right)^2},$$

wherein x is the vector of the first time sequence, y is the vector of the second time sequence, $\theta_{xy}$ is the angle between the vector of the first time sequence and the vector of the second time sequence, and $\sin\theta_{xy}$ is the dissimilarity in angle between the vector of the first time sequence and the vector of the second time sequence.

13. The electronic device according to claim 9, wherein the processor is configured to:

classify the first time sequence corresponding to the first attribute in the first sample to be detected by using a preset one-class Support Vector Machine (SVM) classifier corresponding to the first attribute;

determine a second detection result for the first time sequence according to a classification result, wherein if the classification result shows a same class, then the second detection result is that the first time sequence is a normal time sequence; otherwise, the second detection result is that the first time sequence is an abnormal time sequence;

weight and sum up the first detection result and the second detection result to obtain a target detection result for the first time sequence.

14. The electronic device according to claim 13, wherein the processor is configured to generate the preset one-class SVM classifier corresponding to the first attribute by:

obtaining historical net flows before the set period of time; and aggregating, for the first attribute of the historical net flows, the historical net flows at a set interval of time according to the first attribute to generate N number of time sequences for the first attribute, wherein the first attribute is any one of the attributes of the net flows; and generating the one-class SVM classifier for the first attribute by using the N number of time sequences corresponding to the first attribute as training data.

15. The electronic device according to claim 13, wherein the processor is configured to:

> determine whether a number of abnormal time sequences is greater than a number of normal time sequences in target detection results corresponding to respective time sequences in each sample to be detected, and if so, determine that the sample to be detected is an abnormal data flow; otherwise, determine that the sample to be detected is a normal data flow.

* * * * *